(12) United States Patent
Rahja

(10) Patent No.: US 8,406,747 B2
(45) Date of Patent: Mar. 26, 2013

(54) COMMUNICATION SYSTEM AND A PERSONAL COMMUNICATION PROXY

(75) Inventor: Petri Rahja, Espoo (FI)

(73) Assignee: Emporime Oy, Helsinki (FI)

( * ) Notice: Subject to any disclaimer, the term of this patent is extended or adjusted under 35 U.S.C. 154(b) by 869 days.

(21) Appl. No.: 11/816,547

(22) PCT Filed: Feb. 20, 2006

(86) PCT No.: PCT/FI2006/050072
§ 371 (c)(1),
(2), (4) Date: Aug. 17, 2007

(87) PCT Pub. No.: WO2006/090010
PCT Pub. Date: Aug. 31, 2006

(65) Prior Publication Data
US 2008/0188180 A1 Aug. 7, 2008

(30) Foreign Application Priority Data
Feb. 22, 2005 (FI) ..................... 20055081

(51) Int. Cl.
*H04M 3/42* (2006.01)
(52) U.S. Cl. .................... 455/414.1; 455/41.2; 455/406; 370/401; 709/206; 709/217
(58) Field of Classification Search ............... 455/41.1, 455/41.2, 405, 406, 3.03, 411, 414.1, 7, 11.1; 709/206, 203, 217, 223, 227, 213, 238; 370/252, 370/355, 401, 466
See application file for complete search history.

(56) References Cited

U.S. PATENT DOCUMENTS

| 6,785,542 | B1 | 8/2004 | Blight et al. | |
| 7,281,028 | B2* | 10/2007 | Aasman | 709/203 |
| 7,543,738 | B1* | 6/2009 | Saunders et al. | 235/380 |
| 7,565,141 | B2* | 7/2009 | Macaluso | 455/419 |
| 2002/0026584 | A1* | 2/2002 | Skubic et al. | 713/180 |
| 2003/0135582 | A1* | 7/2003 | Allen et al. | 709/217 |
| 2004/0078593 | A1* | 4/2004 | Hind et al. | 713/201 |
| 2005/0015462 | A1 | 1/2005 | Lee et al. | |
| 2006/0036689 | A1* | 2/2006 | Buford et al. | 709/206 |
| 2006/0168093 | A1* | 7/2006 | Kanai et al. | 709/213 |
| 2008/0244018 | A1* | 10/2008 | Chen et al. | 709/206 |
| 2009/0285118 | A1* | 11/2009 | Yoshikawa et al. | 370/254 |
| 2010/0057878 | A1* | 3/2010 | Parsons et al. | 709/206 |

FOREIGN PATENT DOCUMENTS

| CN | 1633073 | 6/2005 |
| EP | 1215639 | 6/2002 |
| EP | 1215853 | 6/2002 |
| FI | 19991978 | 9/1999 |
| JP | 2001251366 | 9/2001 |

(Continued)

*Primary Examiner* — Sujatha Sharma
(74) *Attorney, Agent, or Firm* — Fasth Law Offices; Rolf Fasth

(57) ABSTRACT

The communication system has service providers arranged to receive service requests. In order to obtain a user friendly solution the system further has a service gateway that has a data storage configured to route a received service request to one of the service providers based on information included in the service request, a personal communication proxy that has a memory, a receiver for receiving a service request over a short-range radio system, and a processor identifying a service provider selected by the subscriber for the service in question, and for sending the service request to the identified service provider, and at least one subscriber apparatus for transmitting a service request.

19 Claims, 1 Drawing Sheet

FOREIGN PATENT DOCUMENTS

| JP | 2002290509 | 10/2002 |
| WO | 0213556 | 2/2002 |
| WO | 02076024 | 9/2002 |
| WO | 03101130 | 12/2003 |
| WO | 2004039111 | 5/2004 |
| WO | 2005121991 | 12/2005 |

* cited by examiner

COMMUNICATION SYSTEM AND A PERSONAL COMMUNICATION PROXY

BACKGROUND OF THE INVENTION

1. Field of the Invention

This invention relates to a communication system providing services to at least one subscriber apparatus which is capable of communicating over a short-range radio system, such as Bluetooth.

2. Description of Prior Art

Previously there are known communication systems where service providers offer services. Such services can in prior art solutions be accessed via computers connected to the Internet or by using mobile phones of cellular radio systems. In order to obtain services from a specific service provider the subscriber uses a computer or mobile phone in order to transmit a service request to the selected service provider. This service request is forwarded via the communication system to a server of the selected service provider based on address information included in the service request.

A drawback in these prior art communication systems is lack of user friendliness as the subscriber in practice has to manually use a computer or mobile phone in order to send a service request. A subscriber might have available several other subscriber apparatuses with a need to transmit service requests. However, prior art solutions fail to provide these other apparatuses with the possibility of transmitting service requests.

SUMMARY OF THE INVENTION

An object of the present invention is to solve the above-mentioned drawback and to provide a solution with improved user friendliness. This object is achieved with the communication system according to independent claim 1, the personal communication proxy according to independent claim 5 and the computer program according to independent claim 10.

The invention utilizes the fact that more and more devices are already during their manufacturing provided with equipment for communicating over a short-range radio system. Bluetooth is an example of such a short-range radio system. These devices therefore have the basic capability needed for transmitting service requests. The personal communication proxy is capable of receiving and processing the service requests in accordance with information about service providers stored in advance in the memory of the personal communication proxy. Thus, the service requests can be forwarded via the personal communication proxy to service providers selected in advance by the subscriber. It is therefore no longer necessary for the subscriber to manually transmit service requests with a mobile phone or computer, but instead also several other subscriber apparatuses can be used to transmit service requests, in some cases even automatically. The user friendliness is thus significantly better than in prior art solutions.

Preferred embodiments of the communication system and the personal communication proxy of the invention are disclosed in dependent claims 2 to 4 and 6 to 9.

BRIEF DESCRIPTION OF DRAWINGS

In the following, the present invention will be described in closer detail by way of example and with reference to the attached drawings, in which.

DESCRIPTION OF SOME EMBODIMENTS

Figure 1:
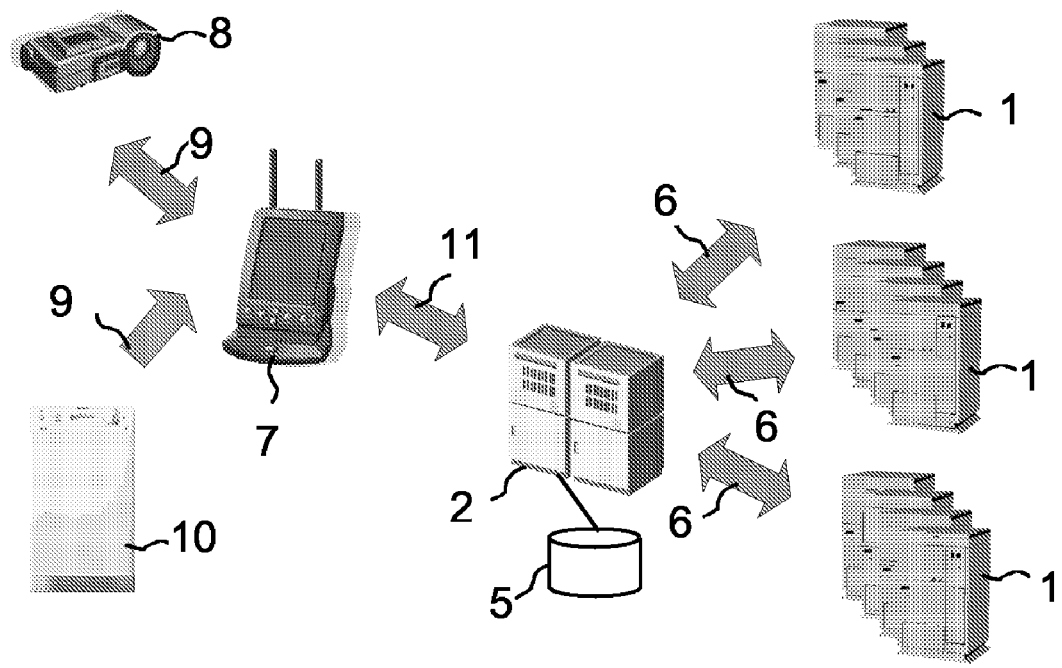
FIG. 1 is a block diagram of a first preferred embodiment of the communication system according to the invention.

FIG. 1 is a block diagram of a first preferred embodiment of the communication system according to the invention.

FIG. 1 shows a communication system including service providers 1 arranged to receive service requests. The service providers 1 can in practice be implemented as servers of different companies. One of the available services can be, for instance, printing of photographs, in which case a subscriber can send his pictures taken with a digital camera via the communication system to this service provider for printing. Another available service might be a repair shop for household appliances, such as for a dishwasher. In that case, a service request to the service provider offering this service might result in a service man from the company offering this service paying a visit to the home of the subscriber in order to check the condition of the dishwasher. It should, however, be observed that the above-mentioned subscriber apparatuses are only two examples of possible apparatuses which can be used in the system according to the invention.

The system 1 further includes a service gateway 2 with a data storage 5. The service providers 1 and the service gateway 2 communicate with each other via a suitable wired or wireless communication path 6. One alternative is to use the Internet for this communication.

The service gateway 2 maintains information about the service providers 1 in the data storage 5 (such as a computer memory or hard disk). This information includes also information about the services offered by the different service providers. When a new service provider is added to the system and when there is a change in the services offered by one of the service providers, the information in the data storage 5 is updated in order to take into account the change.

The data storage 5 of the service gateway 2 also includes other information, such as information about each personal communication proxy 7 which is authorized to utilize services via the service gateway 2. Each time a service request is received at the service gateway 2 from a personal communication proxy 7, the service gateway analyses the service request in order to identify the personal communication proxy from where the service request was sent, and in order to ensure that the identified personal communication proxy is authorized to utilize services via the service gateway 2. If the personal communication proxy is authorized, then the service request is forwarded from the service gateway to a service provider 1. The service provider is identified based on information included in the service request.

The service gateway 2 also maintains other information, such as billing information. Each time a service request is sent to one of the service providers 1, the account of the personal communication proxy from where the service request was received is updated in order to charge the subscriber (owner or user) of the personal communication proxy for the service request. One alternative is to charge only a fee for forwarding the request. Alternatively, also the service provided by the service provider 1 can be charged via the service gateway 2. In the latter case when the service is printing photographs, then the service provider carrying out the printing can transmit a message to the service gateway in order to indicate the amount that needs to be charged from the account of the personal communication proxy in question.

To make such charging possible, it is necessary for subscribers who want to use the service gateway 2 to register in advance. Thus, an account can be established and a suitable charging routine (for instance via a bill or via a credit card) can be agreed on. If the service provided by a service provider is charged via the service gateway, then an account needs to be established also for the service provider in order to credit the service provider for the services provided.

The personal communication proxy 7 can consist of a fixed device, such as a computer unit installed in the home of the subscriber. Alternatively, the personal communication proxy 7 can consist of a portable device, such as a mobile phone. The personal communication proxy communicates with the service gateway 2 via a wired or wireless communication path 11. In case of a fixed device, this communication path can consist of the Internet, for instance. A wireless communication path can be implemented via a GPRS (General Packet Radio Service) UMTS (Universal Mobile Telephone Service) or WLAN (Wireless Local Area Network) connection.

The subscriber (user) of the personal communication proxy 7 can access the information stored in the data storage 5 of the service gateway 2 in order to find out the services and service providers available via the service gateway 2. In this connection, the subscriber can select preferred service providers 1 and store information about them in the memory of the personal communication proxy 7. The subscriber can also store his address and name in the memory of the personal communication proxy. This information together with information identifying the personal communication proxy can be added to service requests transmitted from the personal communication proxy 7 to the service gateway 2.

A digital camera is an example of a subscriber apparatus 8 which can be used in the communication system of FIG. 1. In this example, it is assumed that the digital camera 8 and the personal communication proxy 7 are both equipped with devices that enable two-way communication between them via a short-range radio system 9, such as a Bluetooth system. In this example it is assumed that the subscriber apparatus uses the Bluetooth Service Discovery Protocol (SDP). In that case, when the subscriber has taken a picture with the camera 8 and wants to print it via a service provider 1, the subscriber uses the user interface of the camera 8 in order to access the communication system. The personal communication proxy 7 detects that a subscriber apparatus is accessing the system, and transmits a list of available service providers via the short-range radio system 9 to the camera 8. This list consists of information regarding those service providers which the subscriber has previously selected and which therefore is stored in the memory of the personal communication proxy 7. The subscriber can then view the list of the available service providers, select a service provider and transmit a service request including the picture information and an identifier of the service provider to the personal communication proxy 7. The personal communication proxy adds information which makes it possible to identify the personal communication proxy to the service request, and forwards it to the service gateway 2. The service gateway forwards the service request to the selected service provider 1, where the picture is printed and delivered by mail to the subscriber. The fee for printing the picture can be charged via the service gateway or alternatively as a separate bill from the service provider to the subscriber.

An other example of a subscriber apparatus 10 which can be used in the communication system of FIG. 1 is a dishwasher. In this example, it is assumed that the dishwasher is not capable of two-way communication with the personal communication proxy 7. Thus, it is sufficient that the dishwasher includes only a transmitter for the short-range radio system 9. The dishwasher is configured to automatically transmit a service request with this transmitter to the personal communication proxy 7, as soon as a malfunction has occurred in the dishwasher 10.

The subscriber has stored information in advance in the memory of the personal communication proxy regarding the dishwasher. This information indicates that all service requests from this subscriber apparatus should be sent to a specific service provider 1, in other words such a service provider who provides the service of repairing dishwashers. Thus, the personal communication proxy is able to identify the correct service provider and send the service request to this service provider. Before sending, the address and name of the subscriber and also information identifying the personal communication proxy 7, are added to the service request. In this way, the service provider will automatically receive information about a malfunction in the dishwasher of the subscriber. A service man can then pay a visit to the home of the subscriber directly or alternatively having contacted the subscriber in order to agree about a suitable time for the visit.

Figure 2:
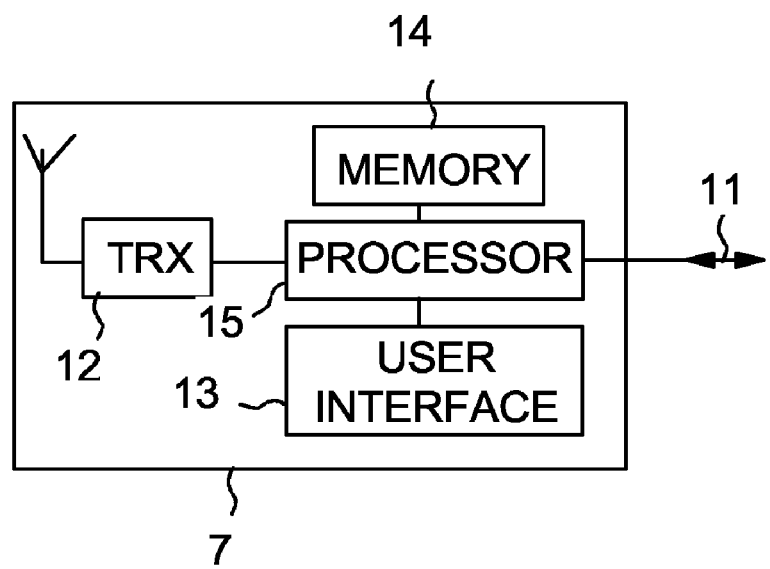
FIG. 2 is a block diagram of a first preferred embodiment of a personal communication proxy according to the present invention.

FIG. 2 illustrates, the personal communication proxy 7 of FIG. 1 in more detail as a block diagram.

In order to facilitate communication over the short-range radio system the personal communication proxy is equipped with a radio transmitter and receiver 12. In case the subscriber apparatuses are of such a type that they are unable to handle two way communication (as the dishwasher in the previous example) it is sufficient that the personal communication has only a receiver.

In this example, it is assumed that the personal communication proxy 7 comprises a user interface 13. Such a user interface can be implemented with a key pad and a display, for instance. This user interface 13 is used by the subscriber to access the information stored in the data storage 5 of the service gateway 2 in order to find out the services and service providers available via the service gateway 2. In this connection the subscriber can select preferred service providers 1 and store information about them in the memory 14 of the personal communication proxy 7. The subscriber can also store his address, name, telephone number and other suitable information in the memory 14 of the personal communication proxy.

According to the present invention the personal communication proxy 7 does not need to have a user interface of the type described above. In that case, it is sufficient to have an interface to an external device instead in order to carry out the tasks described above. Such an interface can be for instance an interface to a computer, a mobile phone or to a network such as to a local area network or the Internet. In that case, the external device which is used for the above mentioned tasks can consist of a computer or mobile phone, which is used to make the selections of the service providers and to store the personal information of the subscriber in the memory via this interface.

The personal communication proxy 7 also comprises a processor 15 which controls the operation of the personal communication proxy 7, and which also carries out the necessary tasks in order to process service requests received via the receiver. The computer program used by the processor in order to control the operation of the personal communication proxy can be stored in the memory 14.

In the example of FIG. 2, it is assumed that the service requests are sent via a fixed communication path 11 to the service gateway. In this case, only an interface to the fixed communication path is sufficient. However, in case the communication path 11 is a wireless communication path, then the personal communication proxy 7 also needs a transmitter and receiver in order to carry out the communication with the service gateway.

The personal communication proxy 7 shown in FIG. 2 can be implemented as a fixed computer unit installed in the home of the subscriber, for instance. Alternatively the personal communication proxy 7 can consist of a portable device, such as a mobile phone.

In the previous examples it has been explained that the personal communication proxy 7 communicates with the service providers via the service gateway. It is, however, according to the present invention also possible to use the personal communication proxy 7 for communication directly with the service providers via a suitable communication path such as a cellular radio system). In such an embodiment the personal communication proxy is provided with suitable communication means, such as a radio transmitter and receiver, in order to send service requests to the service providers.

It is to be understood that the above description and the accompanying figures are only intended to illustrate the present invention. It will be obvious to those skilled in the art that the invention can be varied and modified also in other ways without departing from the scope of the invention.

The invention claimed is:

1. A communication system, comprising:
   accessing means for finding out, from a data storage of a service gateway, which service providers are available via the service gateway,
   developing means for developing a list of available service providers from the available service providers and sending means for sending the list to a personal communication proxy,
   the personal communication proxy for each subscriber apparatus authorized to utilize services via the service gateway and having memory means for storing the list of available service providers associated with a subscriber apparatus of a subscriber,
   the personal communication proxy having detection means for detecting and identifying the subscriber apparatus accessing the communication system,
   the personal communication proxy having retrieving means for retrieving the list of available subscribers from the memory means based on the detection and identification of the subscriber apparatus and sending the list to the subscriber apparatus,
   selecting means for selecting a preferred service provider from the list,
   a receiver having means for receiving a service request from the subscriber apparatus over a short-range radio system, the service request having information about the preferred service provider selected from the list of available service providers,
   the personal communication proxy having means for identifying the preferred service provider, and for sending the service request to the preferred service provider, and
   the subscriber apparatus having a transmitter for transmitting the service request via the short-range radio system to the personal communication proxy.

2. The communication system according to claim 1, wherein the short-range radio system is a Bluetooth system.

3. The communication system according to claim 1 wherein the personal communication proxy is configured to add information identifying the personal communication proxy to a received service request prior to sending the service request, and the service gateway is configured to analyze a received service request in order to identify the personal communication proxy which has sent the service request, and to store, in a memory, information relating to the service request in order to charge the subscriber of the personal communication proxy for the service request.

4. The communication system, according to claim 1 wherein the subscriber apparatus is a household appliance.

5. A personal communication proxy, comprising:
   selection-receiver means for receiving information about preferred service providers selected by a subscriber,
   memory means for storing a list of available service providers selected by the subscriber,
   detection means for detecting a subscriber apparatus of the subscriber accessing a system associated with the personal communication proxy,
   transmitting means for transmitting the list of available services providers to the subscriber apparatus,
   request-receiver means for receiving a service request over the short-range radio system from the subscriber apparatus,
   the service request having information about a selected service provider selected from the list of available service providers, and
   a processor having means for processing the received service request and the information stored in the memory means, the processor having means for retrieving information about the selected service provider from the memory means, and means for sending the service request via a communication path to the selected service provider.

6. A personal communication proxy according to claim 5, wherein the personal communication proxy has a transmitter for transmitting the information about selected service providers via the short-range radio system.

7. A personal communication proxy according to claim 5 wherein the short-range radio system is a Bluetooth system.

8. A personal communication proxy according to claim 5 wherein the personal communication proxy has a user interface for providing the subscriber with information about service providers available via the personal communication proxy, and for receiving and storing, in the memory, information about the service providers selected by the subscriber for different services.

9. A personal communication proxy according to claim 5 wherein the personal communication proxy has an interface to an external device, and the personal communication proxy is configured to send information about service providers available via the personal communication proxy via the interface, and to receive via the interface and store in the memory information about the service providers selected by the user for different services.

10. A communication system, comprising:
    a personal communication proxy in communication with a service gateway,
    the service gateway being in communication with service providers, the service gateway having data storage means for storing a list of available service providers,
    a subscriber apparatus in wireless communication with the personal communication proxy,
    selecting means for selecting a preferred service provider from the list of available service providers and transmitting means for sending information about the preferred service provider to the personal communication proxy,
    the personal communication proxy having receiving means for receiving information about the preferred service provider and memory means for storing the information about the preferred service provider,
    means for sending a service request from the apparatus to the personal communication proxy, the personal communication proxy flaying detection means for detecting the service request being sent from the apparatus and retrieving means for identifying and retrieving, from the memory means, information about the preferred service provider selected by a user of the apparatus in advance, means for carrying out a service requested in the service request, and the service gateway having means for contacting the preferred service provider.

11. A method of using a communication system, comprising:

a subscriber accessing a data storage of a service gateway, the data storage storing a list of available service providers, the subscriber selecting a preferred service provider from the list or available service providers, storing information about the preferred service provider in a memory of a personal communication proxy in communication both with the service gateway and a subscriber apparatus of the subscriber, a receiver of the personal communication proxy receiving a service request for a service from the subscriber apparatus, the receiver detecting and identifying the subscriber apparatus as a sender of the service request, based on the detection and identification of the subscriber apparatus, the personal communication proxy retrieving the preferred service provider from the memory, and the personal communication proxy sending the service request from the subscriber apparatus via the service gateway to the preferred service provider.

12. The method of claim 11 wherein the method further comprises:

the personal communication proxy adding information identifying the personal communication proxy to a received service request prior to sending the service request, the service gateway analyzing a received service request, the service gateway identifying the personal communication proxy and storing, in a memory, information relating to the service request, and the service gateway charging the subscriber of the personal communication proxy for the service request.

13. A method of using a communication system, comprising:

a subscriber selecting a preferred service provider from a list of available service providers stored in a service gateway, a memory storing information about the preferred service provider selected by the subscriber and associating the preferred service provider with a subscriber apparatus of the subscriber, the subscriber apparatus sending a service request for a service to the personal communication proxy, a receiver receiving the service request from the subscriber apparatus, a processor processing the received service request and identifying the subscriber apparatus as a sender of the service request, based on the identification of the subscriber apparatus as the sender of the service request, the processor obtaining information from the memory about the preferred service provider selected by the subscriber in advance for the service in question, and the processor sending the service request via a communication path to the preferred service provider.

14. The method of claim 13 wherein the method further comprises a transmitter of the personal communication proxy transmitting the information about selected service providers via the short-range radio system.

15. The method of claim 13 wherein the method further comprises a user interface of the personal communication proxy providing the subscriber with information about service providers available via the personal communication proxy, and receiving and storing information about the service providers selected by the subscriber for services.

16. The method of claim 13 wherein the method further comprises the personal communication proxy sending information about service providers available via the personal communication proxy via an interface, the personal communication proxy receiving via the interface and storing information about the service providers selected by the user for services.

17. A method of using a communication system, comprising:

a subscriber apparatus accessing a data storage of a service gateway and creating a list of available service providers, a personal communication proxy storing, in a memory, the list of available service providers selected by the subscriber for services, the personal communication proxy detecting that a subscriber apparatus of the subscriber is accessing the communication system, the personal communication proxy transmitting the list of available service providers to the subscriber apparatus of the subscriber, the subscriber selecting a service provider from the list of available service providers, the subscriber apparatus sending a service request for services including information about the selected service provider to the apparatus, the personal communication proxy processing the received service request and identifying the selected service provider selected by the subscriber in advance for the service in question and retrieving information from the memory about the selected service provider, and the personal communication proxy sending the service request from the subscriber via a communication path to the selected service provider.

18. A personal communication proxy according to claim 8, wherein the personal communication proxy has means for transmitting the list of available service providers to the subscriber apparatus, the list consisting of information regarding the service providers which were previously selected by the subscriber and stored in the memory of the personal communication proxy.

19. A personal communication proxy according to claim 8, wherein the personal communication proxy has means for identifying a correct service provider upon receiving a request from a subscriber apparatus by means of information stored in advance by the subscriber in the memory of the personal communication proxy and means for sending the service request to the identified service provider.

* * * * *